(12) United States Patent
Gao

(10) Patent No.: US 7,436,607 B1
(45) Date of Patent: Oct. 14, 2008

(54) LENS MODULE

(75) Inventor: Jie Gao, Fujian (CN)

(73) Assignee: Genius Electronic Optical Co., Ltd., Ta-Ya Shiang (TW)

( * ) Notice: Subject to any disclaimer, the term of this patent is extended or adjusted under 35 U.S.C. 154(b) by 0 days.

(21) Appl. No.: 11/761,102

(22) Filed: Jun. 11, 2007

(51) Int. Cl.
*G02B 7/02* (2006.01)
*G02B 15/14* (2006.01)

(52) U.S. Cl. .................. 359/819; 359/811; 359/823; 359/696; 359/698; 359/699; 396/79

(58) Field of Classification Search ................. 359/811, 359/819, 820, 823, 694–704; 396/72, 79, 396/83, 87, 90, 132, 133, 144, 208, 449; 348/373, E5.027, E5.028; 353/100, 101; 257/88, 432–434; 250/239; 362/35; 235/462.2, 235/462.21, 462.24, 462.42
See application file for complete search history.

(56) References Cited

U.S. PATENT DOCUMENTS

| 3,671,108 | A | * | 6/1972 | Kilgus | ......................... 359/820 |
| 3,696,725 | A | * | 10/1972 | Lange | ......................... 359/823 |
| 5,005,948 | A | * | 4/1991 | Takahashi et al. | ........... 359/819 |
| 6,547,402 | B2 | * | 4/2003 | Masuda | ....................... 353/101 |
| 6,792,204 | B2 | * | 9/2004 | Suh | .............................. 396/90 |
| 6,832,725 | B2 | * | 12/2004 | Gardiner et al. | ........ 235/462.21 |
| 7,054,073 | B2 | * | 5/2006 | Shirie | ......................... 359/699 |
| 7,268,959 | B2 | * | 9/2007 | Shyu et al. | ................... 359/819 |
| 7,307,663 | B2 | * | 12/2007 | Pokrovsky et al. | .......... 348/373 |
| 7,356,252 | B2 | * | 4/2008 | Wang | .......................... 396/79 |

* cited by examiner

*Primary Examiner*—Loha Ben
(74) *Attorney, Agent, or Firm*—Browdy and Neimark, P.L.L.C.

(57) ABSTRACT

A lens module includes a base; a focusing ring rotatably mounted to the base and having at least one driving portion formed on a torus thereof, the driving portion having at least two positioning portions and at least one inclined portion in connection with the two positioning portions, the two positioning portions being located at different radial positions of the ring body; and a combination holder being fitted onto the focusing ring to be rotatable on an internal sidewall the focusing ring, the combination holder having at least one convex portion contacting against one of the at least two positioning portions, the combination holder being combined with a lens barrel that a lens set is received. Accordingly, while the focusing ring is rotated, the combination holder is axially moved to change the axial distance between the combination holder and the base, finally attaining the focusing effect.

3 Claims, 4 Drawing Sheets

LENS MODULE

BACKGROUND OF THE INVENTION

1. Field of the Invention

The present invention relates generally to photographing devices, and more particularly, to a lens module.

2. Description of the Related Art

As the digital products have been diversified, such as personal digital assistants (PDA), mobile phones, or other small portable terminal apparatuses, each of them is broadly combined with a miniature photographing device, like lens module, to have photographing function. In the early application to such digital products, the lens modules are mostly formed of fixed-focus lenses which fail to adjust the local length and then to vividly photograph landscape at short range.

To provide the consumers with better photographic quality, the manufacturer developed a miniature lens module for adjustment of local length. FIG. 1 illustrates a focusing miniature lens module, which is composed of a base A1, a focusing ring A2, a holding member A3, and a lens barrel A4. The focusing ring A2 includes a plurality of recessions A21 formed at an internal sidewall thereof. Each of the recessions A21 has at least two positioning portions A22$a$ and A22$b$ and an inclined portion A23. The positioning portions A22$a$ and A22$b$ are formed at a bottom side of the focusing ring A2 and located axially at different positions of the same. The inclined portion A23 is located between the two positioning portions A22$a$ and A22$b$. The focusing ring A2 further includes a plurality of lugs A24 formed on an external edge thereof. The base A1 includes an upright annular wall A11, and a plurality of convex portions A12 protruding outward from an external edge thereof and corresponding to the recessions A21 and having the same number as the recessions A21. The focusing ring A2 is fitted onto the upright annular wall A11 of the base A1 to enable the positioning portions A22$a$ to lie against the corresponding convex portions A12. The holding member A3 is mounted onto the base A1, having a plurality of holding tongues A31 corresponding to the lugs A24 respectively and holding the corresponding lugs A24 for enabling the positioning portions A22$a$ to closely lie against the corresponding convex portions A12. The lens barrel A4 is mounted onto the focusing ring A2 for receiving a set of lenses.

In light of the above, when the focusing ring A2 is rotated on the upright annular wall A11, the focusing ring A2 lies against the convex portions A12 and then moves along the inclined portion A23 from the positioning portion A22$a$ to the other positioning portion A22$b$. Because the two positioning portions A22$a$ and A22$b$ of each recession A21 are located axially at different positions of the focusing ring A2, when the focusing ring A2 lies against the convex portions A12 and then moves along the inclined portion A23 from the positioning portion A22$a$ to the other positioning portion A22$b$, the axial distance between the focusing ring A2 and the base A1 is subject to change for adjustment of the local length.

The aforementioned lens module A is defective in that the concentricity between the lens set in the lens barrel A4 and the image sensor B is subject to deviation, because the lens barrel A4 mounted onto the focusing ring A2 is subject to rotation along with the focusing ring A2 while rotated, to depart the focus spot of the lens set from the image sensor B where images ought to be received, further affecting the imaging quality.

SUMMARY OF THE INVENTION

The primary objective of the present invention is to provide a lens module, in which the concentricity between the lens set in the lens barrel and the image sensor, while the focusing is done, is never subject to deviation to maintain good imaging quality.

The foregoing objective of the present invention is attained by the lens module, which is composed of a base, a focusing ring, and a combination holder, and the primary feature lies in that the focusing of the lens module is done by the focusing ring and the combination holder.

The focusing ring is rotatably mounted to the base, having a ring body and at least one driving portion formed on a torus thereof. The driving portion has at least two positioning portions and at least one inclined portion in connection with the two positioning portions. The two positioning portions are located at different radial positions of the ring body. The combination holder is fitted onto the focusing ring to be rotatable on an internal sidewall of the ring body of the focusing ring. The combination holder has at least one convex portion contacting against one of the two positioning portions. The combination holder is provided for combination with a lens barrel that a lens set is received.

In light of the above, rotate the focusing ring to enable the convex portion to contact against the combination holder to move along the inclined portion from one of the positioning portions to the other, so that the combination holder is axially moved to change the axial distance between the combination holder and the base, finally attaining the focusing effect.

In the process of the above-mentioned focusing, the combination holder is only axially moved other than rotated to thus prevent the lens set in the lens barrel from deviation of the concentricity between the lens set and the image sensor.

DETAILED DESCRIPTION OF PREFERRED EMBODIMENTS

Figure 1:
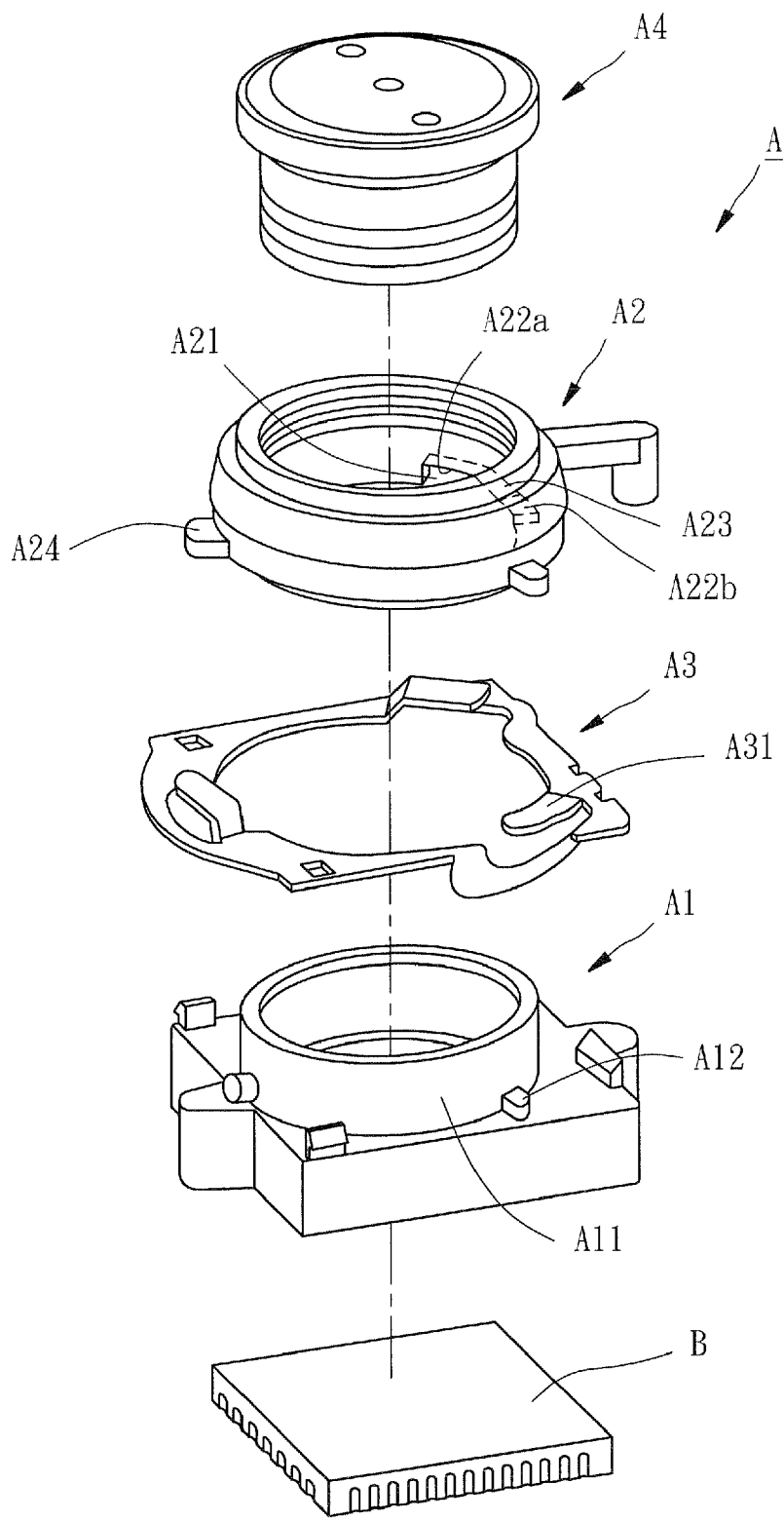
FIG. 1 is an exploded view of a preferred embodiment of the prior art.
Figure 2:
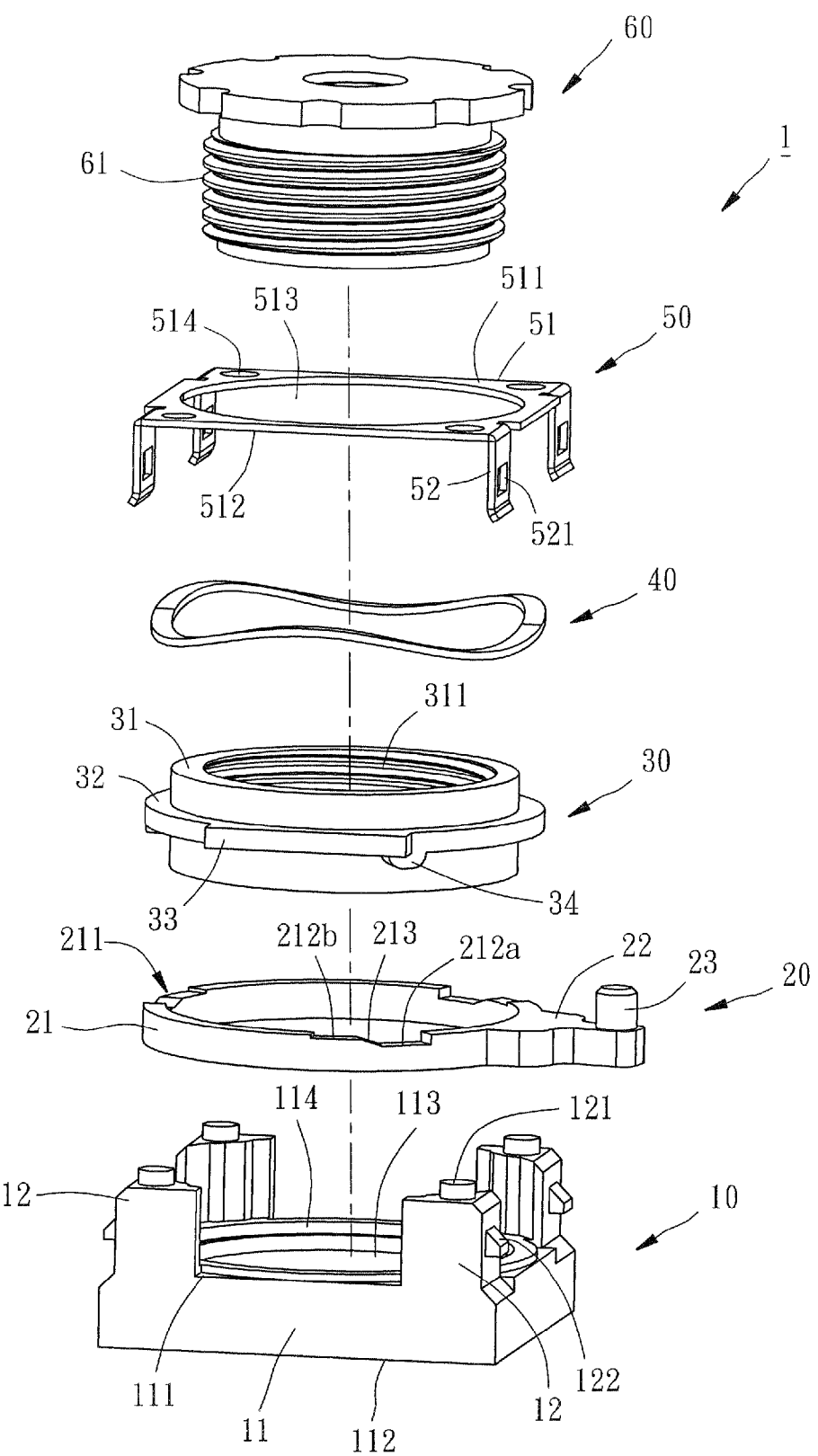
FIG. 2 is an exploded view of the preferred embodiment of the present invention.

Referring to FIG. 2, a lens module 1 constructed according to a preferred embodiment of the present invention is composed of a base 10, a focusing ring 20, a combination holder 30, a wavelike resilient ring 40, a holding member 50, and a lens barrel 60.

The base 10 includes a main body 11 and four combinative columns 12. The main body 11 has a first end surface 111, a second end surface opposite to the first end surface 111, a through hole 113 running through the first and second end surfaces 111 and 112, and an upright annular wall 114 extending upright along circumference of the through hole 113 from the first end surface 111. The four combinative columns 12 extend outward from four corners of the first end surface 111 toward the same direction, each two having a predetermined interval therebetween. Each of the combinative columns 12 has a positioning stake 121 and a stop portion 122, which are located a top side thereof and a lateral side thereof respectively.

The focusing ring 20 includes a ring body 21, an extension portion 22 extending sideward from the ring body 21, a switch lever 23 extending upward from the extension portion 22. The ring body 21 has three driving portions 211 formed on a torus thereof and arranged equidistantly along the torus. Each of the driving portions 211 has two positioning portions 212a and 212b and an inclined portion 213 in connection with the two positioning portions 212a and 212b. The two positioning portions 212a and 212b are located at different radial positions of the ring body 21 respectively. The focusing ring 20 is fitted onto the upright annular wall 114 to be rotatable on the annular wall 114. The extension portion 22 is located between the two combinative columns 12.

The combination holder 30 includes a barrel 31, a peripheral annulus 32 extending outward from an external sidewall of the barrel 31, a limiting portion 33 extending outward from the peripheral annulus 32, and three convex portions 34 located on an external sidewall of the barrel 31 and arranged equidistantly. The barrel 31 is provided with an internal thread formed on an internal sidewall. The combination holder 30 is fitted in the focusing ring 20 to be relatively rotated on the internal sidewall of the ring body 21 to enable the convex portions 34 to contact against the positioning portion 212a of the focusing ring 20 and the limiting portion 33 to be located between the two combinative columns 12.

The wavelike resilient ring 40 is fitted onto the barrel 31, having an end surface contacting against the peripheral annulus 32.

The holding member 50 includes a main body 51 and four combinative pieces 52. The main body 51 has a first end surface 511, a second end surface 512, a circular through hole 513 running through the first and second end surfaces 511 and 512, and four positioning holes 514 running through four corners thereof. The four combinative pieces 52 extend outward toward the second end surface 512 from the four corners of the main body 51. Each of the combinative pieces 52 has a combinative hole 521. The holding member 50 is mounted onto the combinative columns 12 to enable the positioning hole 514 to be fitted onto the positioning stakes 121 and to enable the combinative hole 521 to be fitted onto the stop portion 122 of the combinative columns 12. The second end surface 512 lies against the other end surface of the wavelike resilient ring 40.

The lens barrel 60 includes a chamber for receiving a lens set, having an external thread 61 formed on an external sidewall thereof. The barrel 60 is mounted onto the combinative holder 30 in such a way that the external thread 61 is fitted with the internal thread 311.

When the lens module 1 is mounted onto a main body of a camera (not shown), the image sensor (not shown) of the camera is located at a bottom side of the base 10. According to the aforementioned structure, the lens module 1 of this embodiment can be set with two focal lengths as recited below.

The status of the lens module 1 set with the first focal length is recited below.

Figure 3:
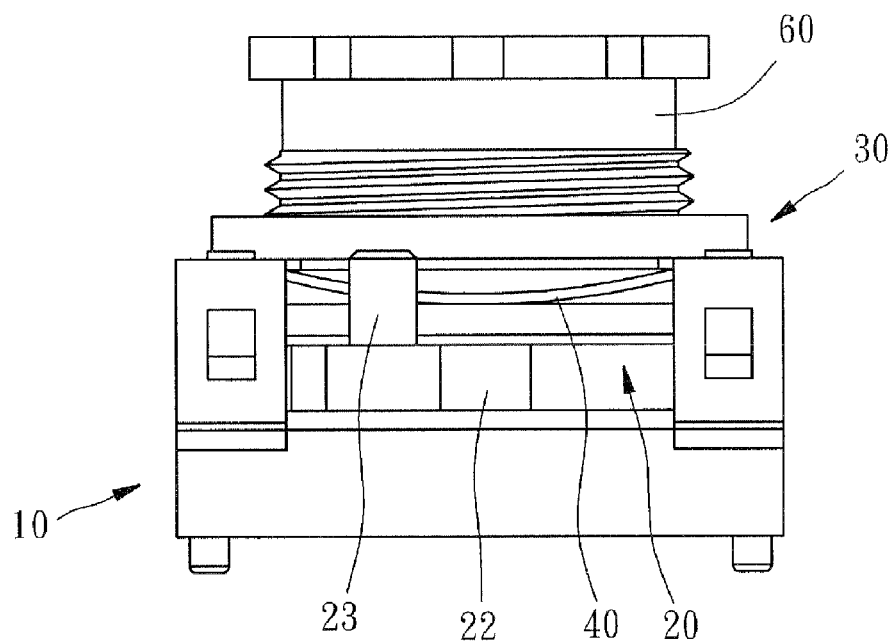
FIG. 3 is a side view of the preferred embodiment of the present invention, illustrating that the lens module is set with a first focal length.
Figure 4:
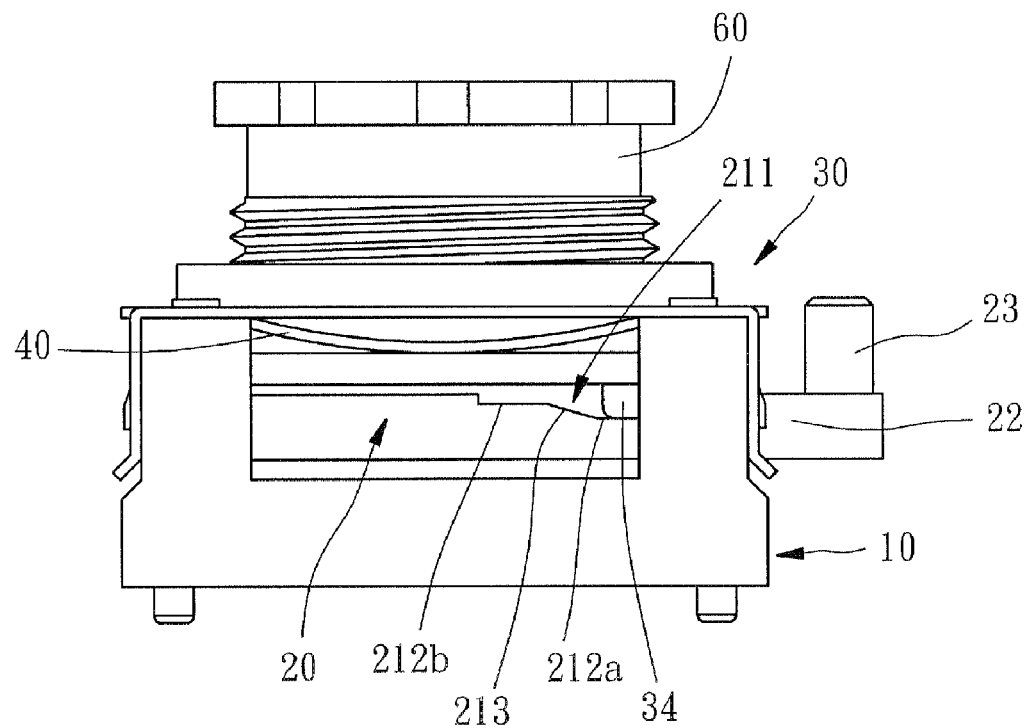
FIG. 4 is similar to FIG. 3, viewed at a different angle.

Referring to FIGS. 3 and 4, when the extension portion 22 of the focusing ring 20 is located at a first position of the base 10, what the focusing ring 20 contacts against the convex portions 34 respectively are the positioning portions 212a. Because the positioning portions 212a are close to the base 10 and the combinative holder 30 is held by the wavelike resilient ring 40 to enable the convex portions 34 to closely lie against the positioning portions 212a respectively, the combinative holder 30 is located at a position close to the base 10, where the first focal length is set between the lens set and the image sensor.

The status of the lens module 1 set with the second focal length is recited below.

Figure 5:
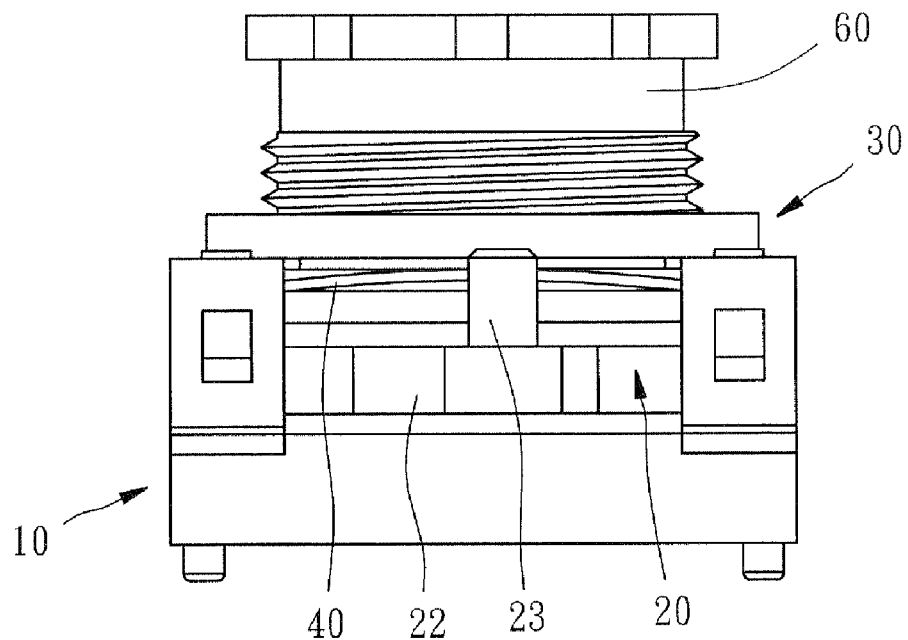
FIG. 5 is a side view of the preferred embodiment of the present invention illustrating that the lens module is set with a second focal length.
Figure 6:
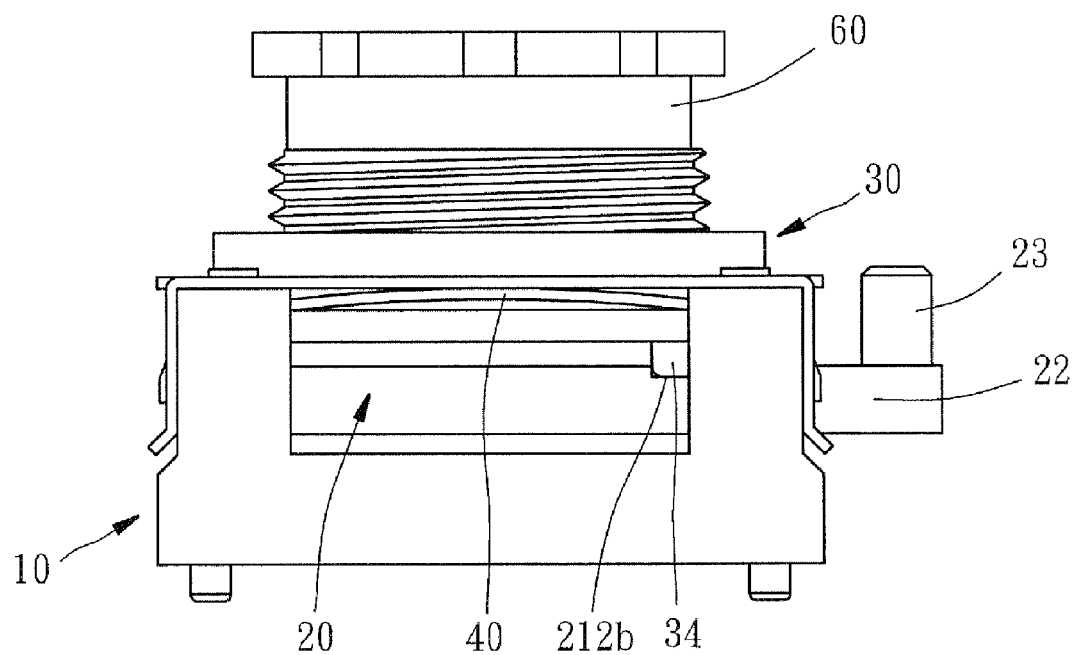
FIG. 6 is similar to FIG. 5, viewed at a different angle.

Referring to FIGS. 5 and 6, the user can use the finger to poke the switch lever 23 to enable the focusing ring 20 to rotate on the upright annular wall 114, such that the extension portion 22 is moved from the first position to the second position. In the meantime, what the focusing ring 20 contacts against the convex portions 34 respectively are transferred from the positioning portions 212a through the inclined portions 213 to the other positioning portions 212b respectively while the extension portion 22 reaches the second position. While the inclined portions 213 keep contacting against the convex portions 34, the combinative holder 30 is moved on itself away from the base 10. When what the focusing ring 20 contacts against the convex portions 34 respectively are transferred to the positioning portions 212b, the combinative holder 30 reaches a position farther away from the base 10, where the second focal length is set between the lens set and the image sensor.

In the focusing of the lens module 1 of this embodiment, because the corresponding two combinative columns 12 contact against two sides of the limiting portion 33 of the combinative holder 30 respectively to hold the combinative holder 30 from rotation. Therefore, the combinative holder 30 does not rotate during the axial movement of the combinative holder 30. In light of this, during the focusing of the lens module 1 of this embodiment, the concentricity between the lens set and the image sensor is never subject to deviation to prevent the focus point of the lens set from departure from where the image sensor is supposed to receive the image, further maintaining due imaging quality after the distance between an object and the lens set is changed.

According to the above-mentioned description, the present invention delicately uses the two elements, i.e. the rotatable focusing ring and the combinative holder, to attain the focusing of the lens module and to ensure the imaging quality of the lens module. Such design not only effectively improves the drawbacks of the lens module but also effectively simplifies each element of the present invention to reduce the production cost.

Although the present invention has been described with respect to a specific preferred embodiment thereof, it is no way limited to the details of the illustrated structures but changes and modifications may be made within the scope of the appended claims.

What is claimed is:

1. A lens module comprising:

a base having a main body and at least three combinative columns, said main body having a first end surface, a second end surface located opposite to said first end surface, a through hole running through said first and second end surfaces, and an annular wall extending outward along a circumference of said through hole from said first end surface, said three combinative columns extending outward from said first end surface toward the same direction, each two of said combinative columns having a predetermined interval therebetween;

a focusing ring having a ring body, an extension portion extending sideward from said ring body, at least one driving portion having at least two positioning portions, and an inclined portion in connection with said at least two positioning portions, said at least two positioning portions being located at different radial positions of said ring body, said focusing ring being fitted onto said annular wall for rotation on said annular wall, said extension portion being located between said two combinative columns;
a combinative holder having a barrel, a peripheral ring extending outward from an external sidewall of said barrel, a limiting portion extending outward from said peripheral ring, and at least one convex portion located at an external sidewall of said barrel, said combinative holder being fitted onto said focusing ring for rotation on an internal sidewall of said ring body of said focusing ring to enable said at least one convex portion to contact against one of said at least two positioning portions of said focusing ring and to enable said limiting portion to be located between said two combinative columns;
a wavelike resilient ring fitted onto said barrel and having an end surface contacting against said peripheral ring;
a holding member mounted to said combinative columns and having an end surface lying against another end surface of said wavelike resilient ring; and
a lens barrel having a chamber for receiving a lens set, said lens barrel being mounted to said combinative holder.

2. The lens module as defined in claim 1, wherein said base comprises four combinative columns extending outward from four corners of said first end surface toward the same direction, each two of said combinative columns having a predetermined interval therebetween, each of said combinative columns having a positioning stake and a stop portion located respectively on a top end thereof and a lateral side thereof; said holding member comprises a main body and four combinative pieces, said main body of said holding member having a first end surface, a second end surface, a circular through hole running through said first and second end surfaces, and four positioning holes running through four corners thereof, said four combinative pieces extending axially outward from the four corners of said main body of said holding member along said second end surface, each of said combinative pieces having a combinative hole, said holding member being mounted to said combinative columns of said base respectively to enable said positioning holes to be fitted onto said positioning stakes of said combinative columns respectively and to enable said combinative holes to be fitted onto said stop portions of said combinative columns respectively, said second end surface contacting against the other end surface of said wavelike resilient ring.

3. The lens module as defined in claim 1, wherein said ring body comprises three driving portions formed on a torus thereof and arranged equidistantly; said combinative holder comprises three convex portions formed on and arranged along an external sidewall of said barrel, each of said convex portions contacting against said at least two positioning portions respectively.

* * * * *